US 6,687,578 B2

(12) United States Patent
Lehman et al.

(10) Patent No.: US 6,687,578 B2
(45) Date of Patent: Feb. 3, 2004

(54) INTEGRATION OF AVIONICS SUBSYSTEMS INTO COCKPIT MULTIFUNCTIONAL DISPLAYS

(75) Inventors: Robert G. Lehman, Peoria, IL (US); David L. Reese, Glendale, AZ (US)

(73) Assignee: Honeywell International Inc., Morristown, NJ (US)

( * ) Notice: Subject to any disclaimer, the term of this patent is extended or adjusted under 35 U.S.C. 154(b) by 0 days.

(21) Appl. No.: 10/113,457

(22) Filed: Mar. 28, 2002

(65) Prior Publication Data

US 2003/0187552 A1 Oct. 2, 2003

(51) Int. Cl.[7] .................................................. G05D 1/00
(52) U.S. Cl. ............................................. 701/3; 701/36
(58) Field of Search ...................... 701/3, 36; 345/700, 345/156, 1.1, 3.1

(56) References Cited

U.S. PATENT DOCUMENTS

| 4,943,919 A | * | 7/1990 | Aslin et al. .................... 701/3 |
| 5,872,526 A | | 2/1999 | Tognazzini | |
| 2002/0198639 A1 | * | 12/2002 | Ellis et al. .................... 701/33 |

FOREIGN PATENT DOCUMENTS

| GB | 0 732 677 A1 | * | 9/1996 | ............ G09B/9/40 |
| WO | WO 0023967 A | | 4/2000 | |
| WO | WO 0224530 A | | 3/2002 | |

* cited by examiner

Primary Examiner—Yonel Beaulieu

(57) ABSTRACT

An apparatus and method are provided for reducing display clutter and improving the readability of a display by eliminating the necessity of providing separate multifunction control/display units and other similar radio/audio/etc. subsystem CDUs in an aircraft cockpit by providing an interface between the pertinent avionics subsystem (e.g., a satellite data unit (SDU)) and a primary display system (PDS) or other multifunction control/display system. The interface also allows the human-machine interface between the avionics subsystem device and the pilot or aircrew member to be consistent with the human-machine interface for the remainder of the aircraft operations. The interface also allows for automatic detection of the type of interface employed between the avionics subsystem and the primary display system or other multifunction display system, thus allowing the subsystem to automatically adapt to its specific installation environment.

15 Claims, 2 Drawing Sheets

INTEGRATION OF AVIONICS SUBSYSTEMS INTO COCKPIT MULTIFUNCTIONAL DISPLAYS

TECHNICAL FIELD

The present invention relates to a display for a vehicle, and more particularly to a method and apparatus for incorporating in the display control and status information of various avionics subsystems.

BACKGROUND OF THE INVENTION

Modern displays, particularly those used in aircraft for flight planning and monitoring, are capable of displaying a considerable amount of information such as flight planning information, flight profile information, navigational information, weather information, radio communication information and other information useful to a crew member or air traffic controller in conducting or monitoring a flight.

With these displays, which are multifunction displays that are chief components of the aircraft's primary display system (PDS), it is possible for a crew member or controller (user) to interact with the display by selecting particular items of information on the display to have the display system emphasize those items such that the selected item is more readily identified, and subsequently to obtain or quickly recognize pertinent information related to the selected item without undue clutter from other items of information on the display. This is advantageous in reducing aircrew workload, as most information is concentrated in a single display and control of the various functions is handled by the aircrew in a common manner.

With typical aircraft instrumentation and control arrangements, certain avionics subsystems (e.g., data communications management, the central maintenance system, the flight management system, and satellite radio communication systems), however, are handled separately and independently from the primary display system. This separate and independent control and display is performed in separate communications modules, known as multifunction control/display units (multifunction CDUs or MCDUs) or similar radio/audio/etc. subsystem CDUs, which require additional space, add additional weight to the aircraft, and increase aircrew workload by diverting the aircrew's attention from the primary display system by requiring operation of the device in a different manner than that of the primary display system and by displaying data or instructions in a format different from that of the primary display system.

In view of the foregoing, it should be appreciated that it would be desirable to provide, for example, satellite communications and similar capability in aircraft not equipped with MCDUs, particularly in the case of smaller aircraft including business aircraft, where weight and space are usually at a premium. In larger aircraft such as commercial airliners, as well as in business aircraft, it would also be desirable to reduce control panel clutter by combining satellite communications, navigation, flight control, and other aircraft operational functions into a common display format such as a multifunction display, thus reducing the workload of aircrew members.

BRIEF SUMMARY OF THE INVENTION

An apparatus and method are provided for reducing display clutter and improving the readability of a display by eliminating the necessity of providing separate multifunction control/display units and other similar radio/audio/etc. subsystem CDUs in an aircraft cockpit.

This is accomplished by providing an interface between the pertinent avionics subsystem (e.g., a satellite data unit (SDU) and a primary display system (PDS) or other multifunction control/display system. The interface also allows the human-machine interface between the avionics subsystem device and the pilot or aircrew member to be consistent with the human-machine interface for the remainder of the aircraft operations. The interface also allows the human-machine interface to be independent of the machine machine interface. The interface also allows for automatic detection of the type of interface employed between the avionics subsystem and the primary display system or other multifunction control/display system, thus allowing the subsystem to automatically adapt to its specific installation environment.

BRIEF DESCRIPTION OF THE DRAWINGS

The present invention will hereinafter be described in conjunction with the appended drawing figures, wherein like numerals denote like elements, and in which.

DETAILED DESCRIPTION OF A PREFERRED EMBODIMENT

Figure 1:
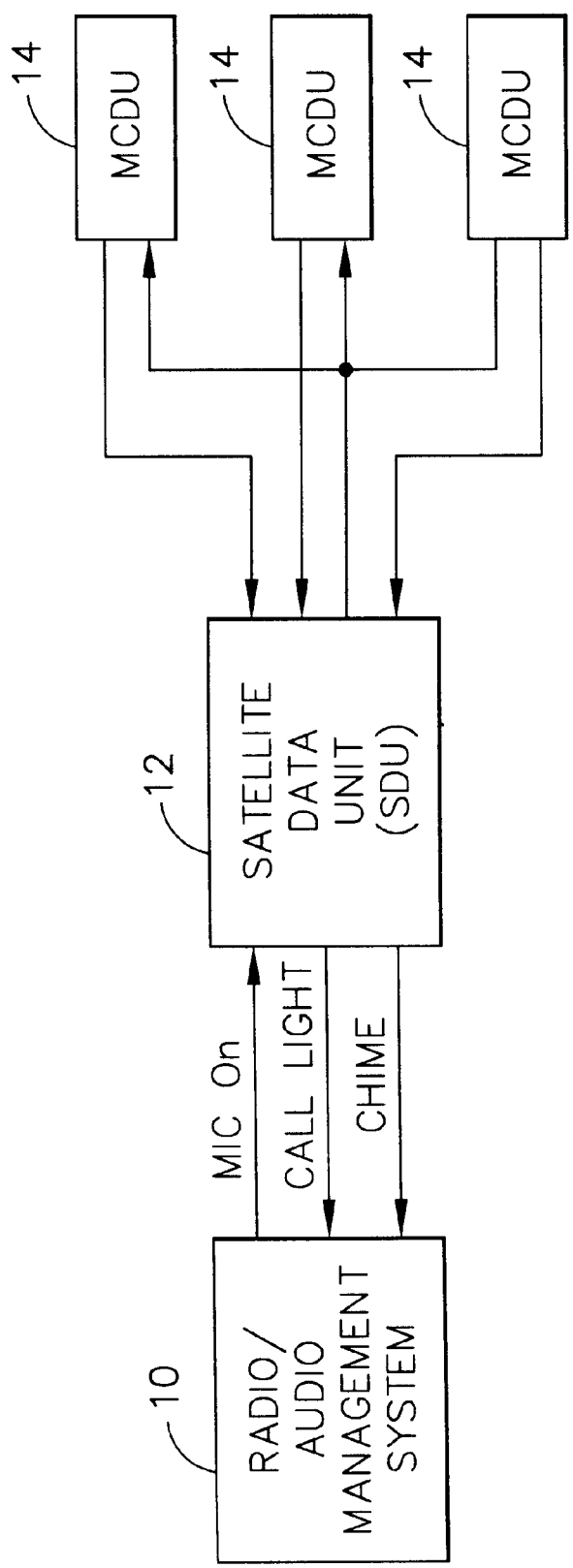
FIG. 1 is a block diagram of a typical display and control system for use with a satellite radio communications system or similar avionics subsystem.

The present invention may be described in terms of functional block diagrams and various processing steps. It should be appreciated that such functional blocks may be realized in many different forms of hardware, firmware, and/or software components configured to perform the various functions. For example, the present invention may employ various integrated circuit components, e.g., memory elements, digital signal processing elements, look-up tables, and the like, which may carry out a variety of functions under the control of one or more microprocessors or other control devices. Such general techniques are known to those skilled in the art and are not described in detail herein. Moreover, it should be understood that the exemplary process illustrated may include additional or fewer steps or may be performed in the context of a larger processing scheme. Furthermore, the various methods presented in the drawing Figures or the specification are not to be construed as limiting the order in which the individual processing steps may be performed.

It should be appreciated that the particular implementations shown and described herein are illustrative of the invention and its best mode and are not intended to otherwise limit the scope of the invention in any way.

FIG. 1 is a block diagram of a typical display and control system for use with a satellite radio communications system. A satellite radio communications system has been selected as being illustrative of an implementation of the invention, it being understood that the invention may be employed with other avionics subsystems as well. This figure shows the connections among a radio/audio management system (e.g., audio control panel, radio control panel, etc.) 10, a satellite data unit (SDU) 12, and one or more multifunction control/display units (MCDU) 14. In this case the control/display output of the SDU 12 is connected to each of the MCDUs 14, and likewise the outputs of each of the MCDUs 14 are connected to the control/display inputs of the SDU 12. Each MCDU has an integral display (not shown) and a series of data entry buttons, for example, a keypad, for entry of data into the MCDU in order to initiate a call, respond to a call, dial a telephone number, etc., or similar control/display functions pertinent to a particular avionics subsystem.

The satellite data unit (as an example avionics subsystem) is the primary unit for radio communications with satellites, for example (but not in the way of limitation) the Inmarsat satellite communications system. The satellite data unit and its associated peripheral units (not shown, e.g., high-power amplifier, antenna, antenna control unit, signal splitters and combiners, etc.) contain all of the interface hardware and software necessary to allow communications with and through the satellite system. The radio/audio management system contains peripheral electronics to interface, for example, with an audio control panel and other radio control functions in the aircraft. The audio control panel (not shown in this FIG., but described below) affords pilot selection and audio level adjustment for all radios in the aircraft. The SDU 12 communicates with the radio/audio management system over buses as shown in FIG. 1. Shown is a signal "mic on" sent from the radio/audio management system 10 to the SDU 12 indicating that the user is communicating through the SDU 12. Two other signals from the SDU 12 to the radio/audio management system 10 are "call light" and "chime" which indicate various call states to the user, for example that there is an incoming call.

In the configuration of FIG. 1, when a crewmember desires to execute a telephony or other subsystem control function (e.g., to place a call) through the satellite radio system, the keypad of the MCDU (and/or similarly, for example, a switch on an audio control panel) is used to initiate the desired operation. If a call is being placed, the crewmember enters the telephone number through the MCDU keypad. There may also be a stored list of telephone numbers which can be accessed through the MCDU keypad as well. The display on the MCDU displays the appropriate message (Make Call, Call Answered, Incoming Call, etc.) in accordance with the operation that is taking place. Discrete light, chime, or other indications also take place in the radio/audio management system, as appropriate.

The interfaces between the various units of FIG. 1 are well known and may be conventional and in accordance with appropriate standards for aircraft communications units.

While the configuration of FIG. 1 is adequate to provide satellite radio communications (or similar avionics subsystem functions) for an aircraft, it requires the use of additional dedicated equipment (the MCDUs 14) with the disadvantages noted above.

Figure 2:
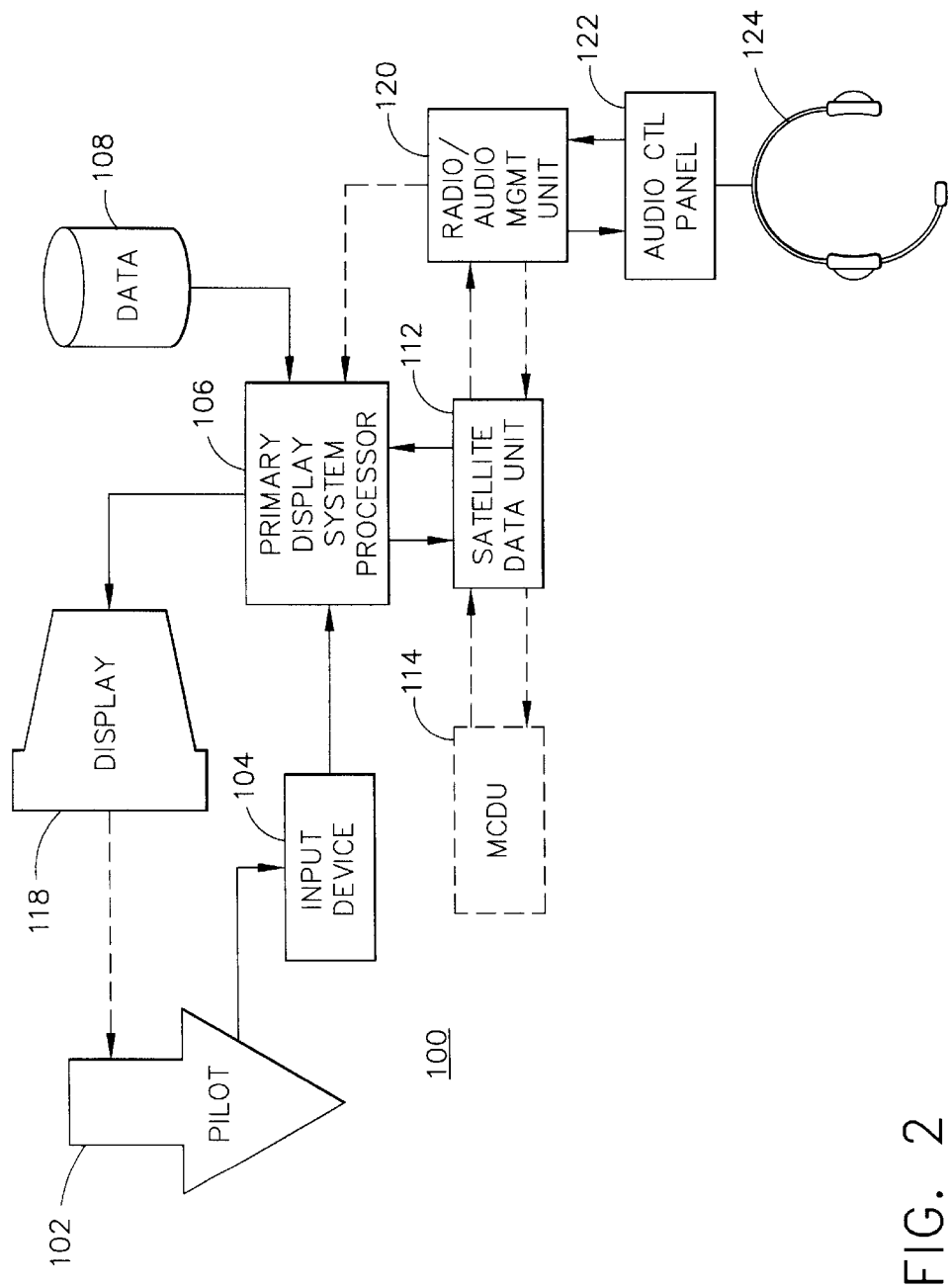
FIG. 2 is a block diagram of a satellite radio communications system (or similar avionics subsystem) integrated with a multifunction control/display system in accordance with the invention.

FIG. 2 is a block diagram of a satellite radio communications system integrated with a multifunction control/display system 100 in accordance with the invention and includes a primary display system processor (PDSP) 106 configured to communicate with an input device 104 through which a pilot or crewmember 102 can provide inputs to the system. The input device may be, for example, a hand input device such as a mouse or a track-ball, a keyboard, or any device which allows a user to point to or select an item on the display or allow entry of data into the display. An associated display 118 and one or more data sources 108 are coupled to the PDSP 106. In general, a user (e.g., a pilot 102) located within a vehicle (e.g., aircraft) (not shown) may provide input to PDSP 106 through input device 104 and receive visual feedback regarding the status of the aircraft or a selected function via a display 118 produced by PDSP 106. Display 118 may include any display monitor suitable for displaying the various symbols and information detailed below. Many currently known display types are suitable for this task, including various CRT and flat-panel display systems. The PDSP 106, input device 104 and display 118 are shown for clarity of description as separate and discrete elements of the system. However, in a practical embodiment these elements may be multiple physical devices (as illustrated) or may be more highly integrated, for example, into one physical device.

The system may be suitably configured for use in a commercial aircraft or any vehicle in which navigational aids, aircraft operation information or communications system information is to be displayed. A number of aspects of display element 118 (which are controlled by PDSP 106 in a practical embodiment) may contribute to the improved contents and appearance of the display element 118, thus increasing the situational awareness of the pilot and/or flight crew. The image generation and display aspects may leverage known techniques such that existing multifunction display systems can be modified in a straightforward manner to support the different features described herein. In a practical implementation, the concepts described herein may be realized in the form of revised display generation software or processing resident at PDSP 106.

PDSP 106 encompasses one or more functional blocks used to provide a flight management, navigational, and positional (and/or other flight information) interface with the pilot, and input to display 118. Primary display system processor 106 may include or cooperate with a database providing navigational information and with sensors providing aircraft operational information. In addition, PDSP 106 may be configured to receive, process, and display information relating to the navigation and communications radios on the aircraft. The input device 104 allows an aircrew member to enter data into PDSP 106 by which the display functions and the associated equipment, for example radios, can be controlled. In this regard, PDSP 106 may include any number of individual microprocessors, flight computers, navigation equipment, memories, storage devices, interface cards including radio interface cards, and other standard components known in the art. Moreover, PDSP 106 may include any number of microprocessor elements, memory elements, power supplies, and other functional components as necessary to support the operation of the multifunction display system 100. In this respect, PDSP 106 may include or cooperate with any number of software programs or instructions designed to carry out various methods, process tasks, calculations, control functions, and the generation of display signals and other data used by display element 118. For example, PDU 106 may be configured to generate windows corresponding to user inputs, equipment status, and the like.

Primary display system processor 106 may also be suitably configured to receive, process, and display data related to radio communications. In certain configurations it may be desirable to utilize a multifunction control/display unit (MCDU) 114, although such a unit, as described with respect to FIG. 1, is not actually required (and is shown as a dashed box with dashed signaling buses to indicate its optional use). An audio control panel 122 is connected to the SDU 112, and a headset 124 and other audio equipment is connected to the audio control panel 122. The audio control panel 122 consolidates all cockpit crew voice communications by providing microphone select buttons that connect the pilot's headset to the desired radio when selected. One or more of the selection buttons may be allocated to satellite communications radios. The audio control panel may also regulate the volume level in the headset.

A radio/audio management system 120 is shown coupled with dashed lines to and from the SDU 112 and the PDSP 106. The radio/audio management system 120 performs the functions as set forth in FIG. 1 including the transmission to the audio control panel 122 of the functionality of the discrete signals (mic on, call light, and chime) or similar from the SDU 112.

In operation, the display 118 is capable of displaying many types of information relating to the operation of the aircraft including, as previously noted, flight planning, navigation, aircraft operation, aircraft performance, radio communications, and the like. Display 118 may show a list of all radios in the aircraft and their status. The pilot or an aircrew member may select a particular radio and change the frequency of the radio, enter new data into the radio, etc., by the use of input device 104. For satellite communications radios, however, it has been conventional to employ an arrangement such as is set forth in FIG. 1, that is, the primary satellite radio unit (the satellite data unit) is connected directly to a multifunction control/display unit. The MCDU 114, as previously noted, has a display and data entry keys, such that most satellite communications operations are done through the MCDU 114. It should be noted that not all satellite communications functions involve the use of the MCDU 114. For example, simply answering a satellite communications call may be performed by selecting the satellite communications radio on the audio control panel. The MCDU is, however, used in many of the satellite communications operations, so it is desirable, and one of the objects of this invention, to eliminate the need for MCDUs in an aircraft avionics system.

In the arrangement of FIG. 2, the satellite data unit 112 is connected to the primary display system processor 106 which accepts data from multiple avionics, navigational, and flight sources and, through graphics processing software, creates windows in the display 118 for each device to be displayed. Data from avionics is passed over the bus shown between the SDU 112 (as an example of an avionics subsystem) and the PDSP 106 using a flexible protocol described below which allows the avionics subsystem to send to the display 118 and receive from the PDSP 106 commands interactively entered by input device 104 to the PDSP 106. The PDSP 106 accepts the messages from SDU 112 and converts the messages into a format to be displayed on display 118. Inputs from input device 104 are translated by PDSP 106 into messages in the flexible message transfer protocol of the invention for transmission to SDU 112 or other avionics subsystem. Graphics processing techniques themselves are known by which such display information may be configured, as are techniques which allow a user to indicate an item on the display and thereby select it for operation and for entering data to the display.

The communication of the SDU 112 with the PDSP 106 may utilize the same physical buses which the SDU 112 conventionally uses when communicating with an MCDU 114. If it is desired that the interfaces between the SDU 112 and the PDSP 106 conform to industry standards, such as ARINC 429, the low-level (physical) signaling protocols are well known in accordance with those standards. Obviously, the signaling protocol adopted must include at least the most common commands and responses of the SDU 112 for the PDSP 106 and the PDU 106 to represent on the display 118 the appropriate status and control information.

Thus, in one mode of operation in an aircraft without MCDUs aboard, if an aircrew member were to wish to make a satellite call, he would select the appropriate radio symbol on display 118. Selection of the radio symbol may call forth a menu of possible operations, for example, "place a call" or "terminate a call". From the menu the user would select "place a call" and perhaps be prompted to enter a number or select a number from memory. After entering a number, the display would be updated to indicate that the call is in progress, the call has been answered, etc. Normal communication continues until the call is terminated by the user so selecting from the display or by other equivalent means.

In this embodiment, the actual signaling protocol among the various units may not be, as noted above, in accordance with an existing standard, so long as the necessary functions are fully defined in the hardware and software interfaces among the units. Of course, in those systems which do employ an MCDU 114 as in FIG. 2, the data interchange between the MCDU 114 and the SDU 112 might well be consistent with the appropriate standard. In either equipment configuration the SDU 112 will automatically recognize the presence or absence of the configuration-dependent units (MCDU 114 or PDSP 106) and the appropriate signaling will be used by the SDU 112 (that is, MCDU 114 protocol vs. PDSP 106 protocol).

A protocol suitable for signaling between an avionics subsystem (for example, a satellite communications radio) and the primary display system processor is defined in the following tables. Table 1 shows a message format for defining variable length messages for use in the instant invention. For purposes of this implementation, the signaling words are structured around eight-bit octet fields. As can be seen from Table 1, the first octet defines the message type. The second octet states the total number of octets in the message, and octets 3-N contain the actual message.

TABLE 1

| Octet Number | Data Description |
| --- | --- |
| 1 | Message Type |
| 2 | No. of Data Octets |
| 3-N | Data (one or more octets) |

Table 2 is an exemplary listing of a few of the possible messages which may be transmitted to/from the primary display system processor and the particular avionics subsystem being addressed.

TABLE 2

| Message Type | Msg. Type Code (hex) | No. of Data Octets |
| --- | --- | --- |
| Make Call | 01x | 12 |
| End Call | 02x | 1 |
| Preempt Call | 03x | 1 |
| Answer Call | 05x | 1 |
| Reject Call | 06x | 1 |
| Log On Command | 10x | 2 |
| Database Request | 12x | 1 |
| Call Announcement | 40x | 1 |
| Log On Status | 61x | 7 |

For example, the message "Make Call" is a message type 01x and contains 12 octets of data, which may include, for example, a number to be called, or the like. The message "Log On Command" is message type 10x and is 2 octets in length. "Database Request" is a non-satellitecommunications-specific message showing that the protocol can be adapted for use with any particular avionics subsystem desired. "Call announcement" is a code which can "chime" or flash a light to alert the aircrew of an incoming call, functions which would have been performed by discrete signals from the SDU 12 to the radio/audio management system or audio control panel (not shown) in the system configuration shown in FIG. 1.

Naturally the signaling protocol is established to include all known control and display messages for the particular avionics subsystems contemplated, and additionally, non-used codes may be left vacant to allow for future expansion to accommodate new or different avionics subsystems, or they may be reserved for use in certain applications while specifically not used in other applications.

While the invention has been described in terms related to the preferred embodiment disclosed herein, it will become apparent to those skilled in the art that modifications may be made which however remain within the scope of the appended claims.

What is claimed is:

1. In an interactive aircraft multifunction control/display system for providing flight management, navigational, and positional information and control to a pilot of the aircraft, the multifunction control/display system having a display system processor coupled to an interactive display and an input device other than a multifunction control/display unit (MCDU), a method for providing an interface between the multifunction control/display system and an avionics subsystem comprising:

providing a flexible message transfer protocol incorporating a set of messages for controlling the avionics subsystem and for displaying the status and permitted operations of the avionics subsystem on the interactive display;

providing an input to the interactive display by a user of the multifunction display system;

using the message transfer protocol, providing the input through the display system processor to the avionics subsystem;

the avionics subsystem responding to the input by initiating an action in response thereto; and using the message transfer protocol, providing an indication through the display system processor of the action taken to the interactive display.

2. A method as set forth in claim 1 in which the message transfer protocol is the primary means of communication between the avionics subsystem and the display system processor.

3. A method as set forth in claim 1 further comprising a multifunction display/control unit having a second display, wherein the avionics subsystem recognizes the presence of the multifunctional control/display unit and displays the status and the permitted operations of the avionics subsystem on the second display.

4. A method as set forth in claim 3 wherein the avionics subsystem is a radio communications unit.

5. A method as set forth in claim 4 wherein the radio communications unit is a satellite communications radio.

6. An interactive aircraft multifunction control/display system for providing flight management navigational, and positional information and control to a pilot of the aircraft, comprising:

a display system processor coupled to an interactive display other than a multifunction control/display unit (MCDU) for providing status and control data on the display, the display system processor further coupled to an input device for pointing to data displayed on the display and for entering data into the display; and an avionics subsystem coupled to the display system processor through a first bi-directional bus, the avionics subsystem communicating with the display system processor over the first bi-directional bus using a message transfer protocol which allows different avionics subsystems to use the first bus to convey messages particular to the avionics subsystem, and receive messages particular to the avionics subsystem from the display system processor, the data displayed on the display comprising status and permitted operations with respect to the avionics subsystem.

7. An aircraft multifunction control/display system as set forth in claim 6 wherein the message transfer protocol is the primary means of communication between the avionics subsystem and the display system processor.

8. An aircraft multifunction control/display system as set forth in claim 7 wherein the avionics subsystem communicates status information to the display system processor and the display system processor communicates commands to the avionics subsystem.

9. An aircraft multifunction control/display system as set forth in claim 8 wherein the status information from the avionics subsystem is caused to be displayed on the interactive display by the display system processor and the commands from the display system processor are acted upon by the avionics subsystem.

10. An aircraft multifunction control/display system as set forth in claim 9 wherein the commands are entered into the display system processor through the input device.

11. An aircraft multifunction control/display system as set forth in claim 7 further comprising a multifunction display/control unit having a second display, the avionics subsystem being additionally coupled to the multifunction control/display unit by the bi-directional bus, wherein the avionics subsystem recognizes the presence of the multifunctional control/display unit and communicates with the multifunctional control/display unit over the bi-directional bus.

12. A method as set forth in claim 7 wherein the avionics subsystem is a radio communications unit.

13. A method as set forth in claim 12 wherein the radio communications unit is a satellite communications radio.

14. A method as set forth in claim 10 wherein the avionics subsystem is a radio communications unit.

15. A method as set forth in claim 14 wherein the radio communications unit is a satellite communications radio.

* * * * *

UNITED STATES PATENT AND TRADEMARK OFFICE
CERTIFICATE OF CORRECTION

PATENT NO.    : 6,687,578 B2                                         Page 1 of 1
DATED         : February 3, 2004
INVENTOR(S)   : Robert G. Lehman and David L. Reese It is certified that error appears in the above-identified patent and that said Letters Patent is hereby corrected as shown below:

<u>Title page,</u>
Item [75], Inventors, "Robert G. Lehman, Peoria, IL (US); David L. Reese, Glendale, AZ (US) should read:
-- [75] Inventors: Robert G. Lehman, Peoria, AZ (US);
                David L. Reese, Glendale, AZ (US) --

Signed and Sealed this

Eleventh Day of May, 2004

JON W. DUDAS
*Acting Director of the United States Patent and Trademark Office*